United States Patent

[11] 3,612,371

[72] Inventor Yoshihisa Katsuyama
 Yokohama-shi, Japan
[21] Appl. No. 791,567
[22] Filed Jan. 16, 1969
[45] Patented Oct. 12, 1971
[73] Assignee Nippon Kogaku K.K.
 Tokyo, Japan
[32] Priority Jan. 20, 1968
[33] Japan
[31] 43/3,574

[54] FILM TRANSMITTING DEVICE OF MINIATURE MOVIE CAMERA
 2 Claims, 3 Drawing Figs.
[52] U.S. Cl..................................... 226/62,
 352/192, 354/194
[51] Int. Cl....................................... G03b 1/22
[50] Field of Search........................... 352/194,
 195, 196, 191, 192, 193; 226/70, 67, 62; 274/23;
 74/28; 308/2

[56] References Cited
 UNITED STATES PATENTS
2,893,287 7/1959 Lunzer......................... 352/196
3,014,626 12/1961 Groves......................... 352/196

FOREIGN PATENTS
455,498 4/1968 Switzerland................. 352/191
1,252,056 10/1967 Germany...................... 352/194
1,163,667 2/1964 Germany...................... 352/194
G516,048 6/1967 Netherlands................. 352/194

Primary Examiner—Louis R. Prince
Assistant Examiner—Denis E. Corr
Attorney—Harry G. Shapiro ABSTRACT: A film transmitting device for a miniature movie camera has a cam associated with a rotary shaft for the shutter and a film transmitting plate provided with a projection cooperable with the cam. The film transmitting plate, which has a claw at one end for entry and retraction from perforations in the film, has its other end formed in substantially U-shape to provide a pair of substantially parallel arm portions. One arm portion is provided with a hole and the other arm portion has a slot which is elongated in the direction toward the plate's claw. Pin means is extended through the hole and the slot. A tension spring is connected to the film transmitting plate to urge the plate's projection against the cam, one end of the spring being connected to the camera body and the other end to the film transmitting plate between the plate's projection and the pin means.

INVENTOR.
YOSHIHISA KATSUYAMA
BY Harry G. Shapiro
ATTORNEY

FILM TRANSMITTING DEVICE OF MINIATURE MOVIE CAMERA

In a movie camera, the film is transmitted intermittently by the operation of a film transmitting plate which is cooperable with an eccentric cam mounted on a rotatable shaft for the shutter, or a shaft parallel to such shaft and synchronously interlocked therewith. A compound motion must be imparted to the film transmitting plate; that is, the plate must move in the direction that the film is to be transmitted and in a direction normal or perpendicular to the plane of the film so that the film transmitting plate's claw may enter and be retracted from perforations in the film.

Since the perforations in the film are narrow and small, and the film transmitting operation must be performed at a relatively high speed, the device for transmitting film have been comparatively complicated and have presented problems. While many forms of film transmitting devices have been devised, these known devices have the limitations that they produce substantial frictional forces and unduly large loads so that the film transmitting plate is subjected to substantial and rapid wear.

The principal object of this invention is to overcome aforementioned limitations and disadvantages.

In accordance with the invention, the film transmitting plate is provided with a claw at one end, and the other end is formed in a substantially U-shape to provide a pair of substantially parallel arm portions. One arm portion has a bore or hole therethrough and the other arm portion is provided with a slot elongated in the direction toward the claw at the opposite end of the plate. Pin means is extended through the hole and the elongated slot. The film transmitting plate is provided with a projection which is cooperable with a cam associated with a rotary shaft for the shutter, or the cam may be associated with another shaft parallel to the shutter shaft and synchronously interlocked therewith. A tension spring resiliently urges the plate's projection against the cam. One end of the spring is connected to the camera body and the other end is connected to the film transmitting plate intermediate the plate's projection and the pin means.

Due to the construction of the device of the invention, twisting of the film transmitting plate in the direction or plane of the film caused by the load applied when the plate is moved back and forth and toward and away from the film is eliminated. Also, the load upon the motor is reduced because the friction between the parts is very small. In addition, the vibration and noise are small even when the film is transmitted at high speeds.

The invention will be described with reference to the drawings illustrating a preferred embodiment thereof, in which.

Figure 1:
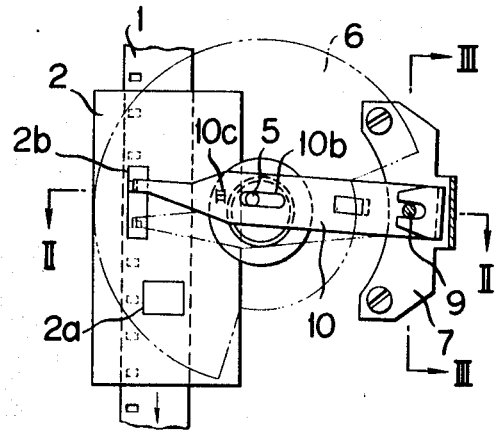
FIG. 1 is a plan view, partly broken away and in cross section, of the device of the invention, the shutter being shown in dot-dash lines to permit the viewing of the associated parts.
Figure 3:
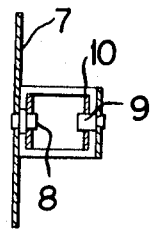
FIG. 3 is a cross section taken approximately in the plane of line III—III of FIG. 1.
Figure 2:
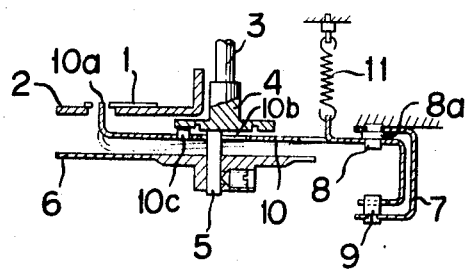
FIG. 2 is a cross section taken approximately in the plane of line II—II of FIG. 1.

Referring to FIGS. 1, 2 and 3, a film 1 is supported by an apertured plate 2 having a window 2a corresponding to frames on the film. The plate 2 is provided with a slot 2b elongated in the direction of film travel to allow the insertion and withdrawal of a claw 10a at one end of a film transmitting plate 10, the claw being adapted to enter and to be retracted from perforations in the film. A shutter shaft 3 is driven or rotated by a motor (not shown). A face cam 4 is fixed to one end of the shutter shaft 3, and a pin 5, which is eccentric with respect to the shutter shaft 3, extends from the cam 4. The amount of offset or eccentricity of the pin 5 with respect to the shutter shaft 3 is of a given or predetermined amount. The rotary shutter 6, formed to furnish a predetermined sector as shown, is fixed to the eccentric pin 5. A support plate 7 is secured to the camera body by any suitable means such as screws. As shown in FIG. 2, the central portion of the support plate is substantially U-shaped to provide a pair of spaced, substantially parallel arm portions connected by the intermediate base portion.

As shown in FIGS. 2 and 3, a pin 8 is secured to one of the arms of the support plate 7, the pin having a flange 8a on the underside of the arm portion of the plate support. A pin 9 is secured to the opposite arm portion of the support plate in alignment with the pin 8. The film transmitting plate 10 is bent or formed in substantially U-shape at the end thereof opposite the end having the claw 10a to provide a pair of substantially parallel arms. As shown in FIG. 2, the U-shaped end of the film transmitting plate is positioned within the dimensionally larger U-shaped portion of the plate support 7. One arm portion of the film transmitting plate has a hole through which the pin 8 is extended and the other arm portion is provided with a slot elongated in the direction toward the claw 10a. The pin 9 is extended through the slot. The pin 8 serves as a center or pivot for the rocking of the film transmitting plate 10, and the pin 9, as related to the slot in which it is positioned, serves as a stop for such plate. The film transmitting plate 10 is provided with an elongated slot 10b through which the eccentric pin 5 is extended (FIG. 1). Also, the film transmitting plate 10 is provided with a projection 10c which is cooperable with the cam 4 (FIG. 2). A tension spring 11 resiliently urges the projection 10c against the cam 4. One end of the spring is connected to the camera body and the other end is connected to the film transmitting plate in a position intermediate the plate's projection 10c and the pin 8.

The relationship of the described parts is such that the film transmitting plate rocks or is oscillated in a plane parallel to the plane of the film about the pivot provided by the pin 8 when the eccentric pin 5 extended through the slot 10b has motion imparted thereto by the rotated shutter shaft 3. The claw 10a of the film transmitting plate has a motion perpendicular to the plane of the film or of the plate 2 by virtue of the action of the rotated cam 4 upon the transmitting plate's projection 10c which is resiliently held against the cam by the tension spring 11. The cam 4, the eccentric pin 5, the rotary shutter 6 and the projection 10c on the film transmitting plate 10 are arranged so that the surface of the film 1 is exposed during the period that the shutter 6 uncovers the window 2a in the plate 2; and, when the shutter is rotated counter clockwise as viewed in FIG. 1, the claw 10a of the film transmitting plate 10 fits into a perforation of the film to transmit the film in the direction of the arrow for a predetermined distance, following which the claw, due to the action of the cam upon the projection 10c, is retracted or disengaged from the film's perforation and then oscillated in a clockwise direction to again fit in another perforation.

In the illustrated and preferred embodiment of the invention as hereinbefore described, the pins 8 and 9 are separate parts. It will be apparent that such pin means may be in the form of a single elongated pin fixed to and extending between the arm portions of the support plate 7. With such modification, the rotary shutter 6 is formed so that there is no interference with such elongated pin. As shown, the effective portion of the shutter, or the portion which is cooperable with the window 2a in the plate 2, is on the opposite side of the shutter.

With the described structure, the device operates as follows. When the shutter shaft 3 is rotated counterclockwise the film transmitting plate 10 is rocked or moved in a clockwise direction due to the predetermined relationship which exists between the eccentric pin 5 and the slotted area 10b of the film transmitting plate 10. At the same time, the film transmitting plate's claw 10a gradually approaches and finally fits into a perforation in the film 1 due to the action of the rotated cam 4. Simultaneously, the claw 10a begins to rock or move in a counterclockwise direction, and transmit the film 1 in the direction of the arrow as shown in FIG. 1. When the claw 10a has transmitted a predetermined amount of film, the claw is withdrawn from the perforation and starts to rock or move in a clockwise direction. When the claw has rotated a predetermined amount in such direction, it again enters a perforation to again transmit the film in the direction of the arrow. The shutter 6 connected to the eccentric pin 5, in turn connected to the shutter shaft 3, is such that the window 2a in the plate 2 is shielded by the shutter when the film is being transmitted, and the shutter uncovers the window so that the film is exposed to light when the film is at rest. It will be apparent that the film may be transmitted in a reverse direction by rotating the shutter shaft 3 in a clockwise, rather than a counterclockwise direction.

It is believed that the advantages and improved results afforded by the invention will be apparent from the foregoing description of a preferred embodiment thereof. It will be apparent that various changes may be made without departing from the spirit and scope of the invention as sought to be defined in the following claim.

What is claimed is:

1. A film transmitting device for a miniature movie camera comprising a cam associated with a rotary shaft for the shutter, a film transmitting plate having a projection cooperable with the cam, a pin eccentric with respect to the rotary shaft connected to the shutter for the rotation of the shutter, an elongated first slot in the film transmitting plate, said pin extending to the shutter through said slot, a claw at one end of the film transmitting plate adapted to enter and to be retracted from perforations in the film, the other end of the film transmitting plate being substantially U-shaped to provide a pair of substantially parallel arm portions, one arm portion having a hole therethrough and the other arm portion having a second slot elongated in the direction toward said claw, fixed pin means extending through said hole and said second slot, and a tension spring to resiliently urge the projection against the cam, one end of the spring being connected to the camera body the other end being connected to the film transmitting plate intermediate the projection and said fixed pin means.

2. A film transmitting device according to claim 1 including a U-shaped support, the U-shaped end of the film transmitting plate being positioned within said support; and wherein the fixed pin means comprises a first pin secured to one arm of the U-shaped support and extended through said hole in one arm portion of the U-shaped end of the film transmitting plate, and a second pin secured to the other arm of the U-shaped support and extended through said second slot.